July 22, 1930.  L. H. TASSELL  1,771,322
WINDOW FOR MOTOR CARS AND OTHER VEHICLES
Filed Aug. 7, 1928  2 Sheets-Sheet 1
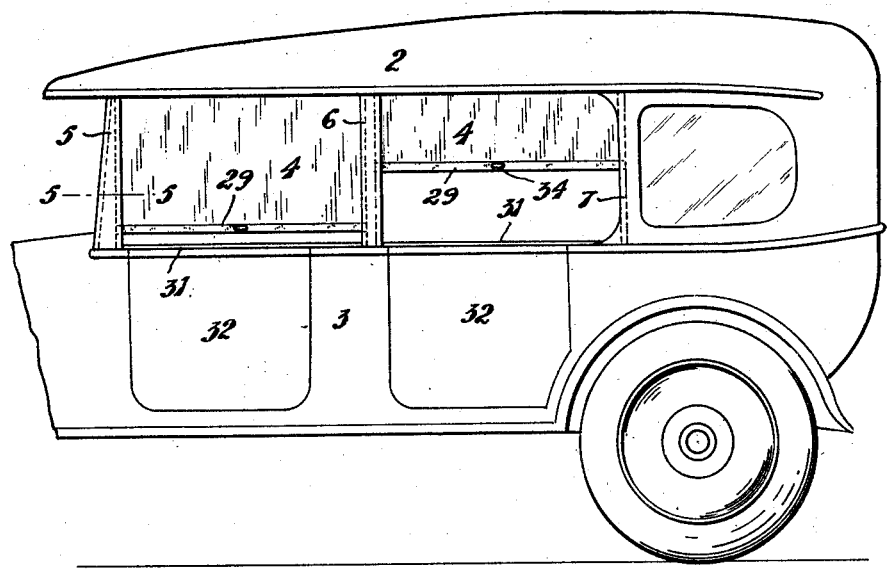
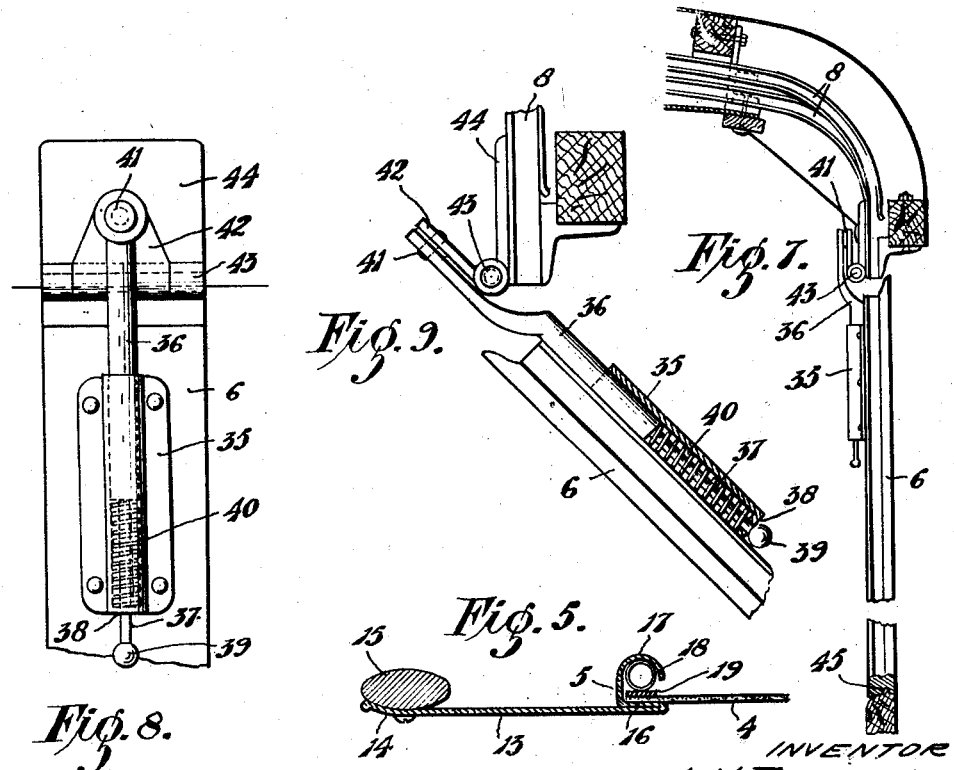

July 22, 1930. L. H. TASSELL 1,771,322
WINDOW FOR MOTOR CARS AND OTHER VEHICLES
Filed Aug. 7, 1928 2 Sheets-Sheet 2
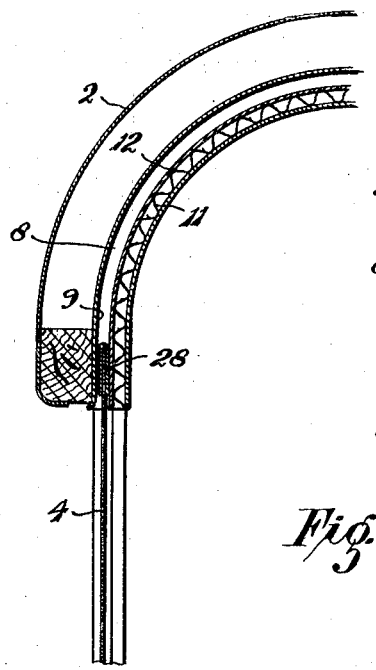
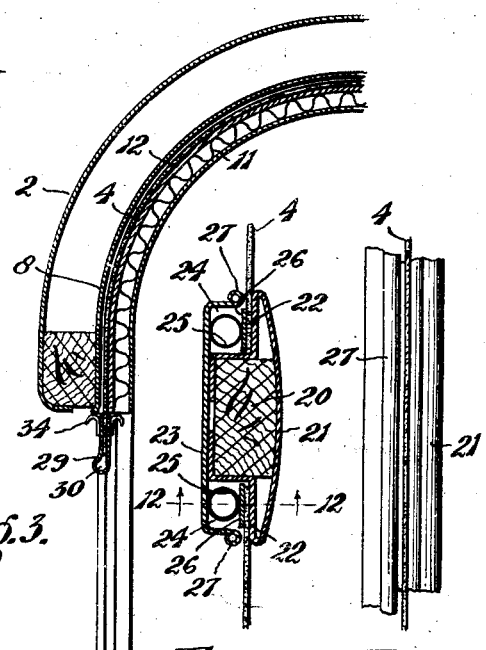
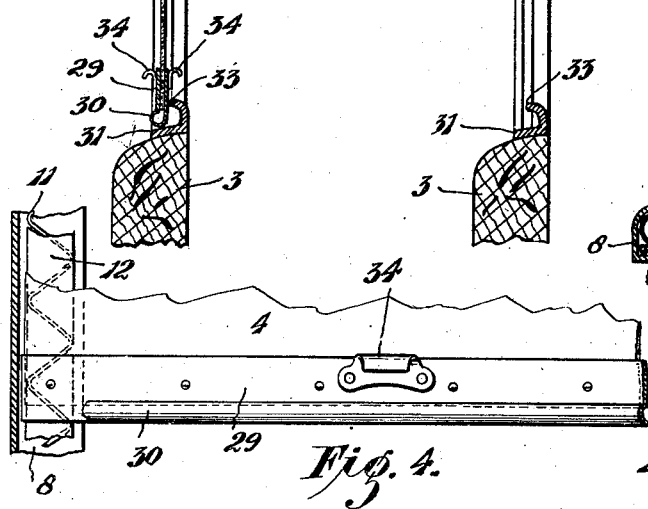
INVENTOR
L. H. TASSELL, Patented July 22, 1930

1,771,322

UNITED STATES PATENT OFFICE

LESLIE HARRY TASSELL, OF CLUNES, AUSTRALIA

WINDOW FOR MOTOR CARS AND OTHER VEHICLES

Application filed August 7, 1928, Serial No. 298,010, and in Australia January 26, 1928.

This invention relates to improvements connected with windows or side curtains for motor-vehicles, railway carriages and the like, but principally for motor cars of the converted tourer type having rigid hoods or tops.

The invention has been devised to provide flexible transparent windows or side curtains which are slidable in vertical guides extending between the vehicle body and the hood or top, and are capable of being slidably moved upwardly into guides on the underside of the hood or top when not required for use. Chief features embodied in the invention are the improved window construction, the improved guides for the windows, the improved means in the guides for frictionally gripping the running edges of the windows to retain them in selected position and prevent ingress of wind, dust or rain, and an improved construction of guide pillar which is pivotally mounted whereby it can be swung upwardly into the hood or top, if so desired, when the windows are not required for use.

Referring to the accompanying drawings:—

Figure 1 is a view in side elevation of a motor car equipped with sliding windows according to the invention.

Figure 2 is a vertical sectional view showing a window in closed position.

Figure 3 is a similar view, but showing the window when slid upwardly into the guides in the hood or top.

Figure 4 is a detail view of the lower end of a window and one of its vertical guides.

Figure 5 is a section on the line 5—5 of Figure 1.

Figure 6 is a sectional view of one of the guides in the hood or top.

Figure 7 is a sectional view illustrating the central pivoted guide pillar for the windows.

Figure 8 is a front view of the pillar.

Figure 9 is a view illustrating the action when the pillar is being pivotally swung into the hood or top.

Figure 10 is a cross-sectional view through the pivoted pillar.

Figure 11 is a side view of Figure 9.

Figure 12 is a section on the line 12—12 of Figure 9.

In these views, 2 indicates the rigid hood or top of a motor car, 3 the body portion of the car, 4 the sliding windows according to the invention and 5, 6 and 7 vertical guide members extending between the hood and the car body to slidably support said windows.

Provided in the hood 2 are curved guides 8 wherein the windows 4 are accomodated when they are slid upwardly. These guides 8 are rigidly secured to the underside of the hood framework and they are constructed of channel-section metal as shown in Figure 6. One side of each guide has a flat portion 9 providing a slide surface for the window, while the opposite side of said guide member is curved to form a housing 10 for a coiled spring 11 which is fitted longitudinally therein. A pressure plate 12 is fitted against the side of the coiled spring 11 and it is pressed outwardly by said spring against the running edge of the window to frictionally grip said window against the flat slide surface 9. By these means the windows are automatically held in any selected position to which they are moved.

The guides 8 in the hood have their lower ends arranged in alignment with the vertical guide members 5, 6 and 7 extending between the hood to the car body 3. The first vertical guide 5 is arranged adjacent to the car windscreen and it consists of a metal plate 13, see Figure 5, which is secured at its forward edge 14 to the windscreen standard 15 and has its rear edge bent to form a flat slide surface 16 and a curved housing 17. A coiled spring 18 is longitudinally accommodated in the housing 17 and bears against a pressure plate 19 which is thereby pressed against the running edge of the window to frictionally grip it against the slide surface 16.

The central guide member 6 consists essentially of a wooden core 20 and an outer metal plate 21, which is secured to said core and is shaped to form two flat slide surfaces 22. An inner plate 23 is secured over the ends of the plate 21, and it has its ends bent inwardly to form two chambers 24 wherein coiled springs 25 are longitudinally housed. These coiled springs exert pressure on pressure plates 26 which grip the running edges of the windows similarly to the pressure plate 19. If desired, the edges of the plate 23 may be curled as shown at 27 to obviate sharp edges such as would scratch or damage the material of the windows.

The vertical guide member 7 at the rear portion of the car is similar in construction to the guide member 5, except that its edge is secured to the framework of the hood instead of to the windscreen standard.

Each of the windows 4 consists of a sheet of thick celluloid or like flexible transparent material bound along its upper and lower edges by metal bands 28 and 29. The running edges of the celluloid sheet are not bound so that the windows can freely slide in the vertical guides between the hood and the body and in the curved guides 8 in the hood.

The metal band 29 on the lower edge of each window is constructed having an enlarged portion 30 to cooperate with a weathering strip 31 provided on the upper edge of the car body 2 and the doors 32. A lip 33 is formed on said strip 31 and is adapted to bear against the inner surface of the band 29 when the window is closed—see Figure 2, and thus prevent ingress of dust, rain or wind beneath the lower edge of the window. The bands 28 and 29 on the upper and lower edges of the windows may extend into the vertical guides and be frictionally gripped by the pressure plates therein as shown in Figure 4. This construction reduces friction and also prevents excessive wear on the running edges of the celluloid windows. If desired, thin strips of flexible metal or other material may be fitted on the running edges of the windows to further minimize wear due to friction.

To enable the windows to be conveniently opened and closed, two handles 34 are provided on each window and are arranged on opposite sides of the lower metal band 29. These handles are adapted to abut against the lower edge of the hood frame when the windows are fully raised, see Figure 3, thus functioning as limit stops determining the upward movement permitted to the windows.

When the windows are not in use, they are accommodated in the curved guides 8 in the hood, as shown in Figure 3, and are restrained against movement therein by being frictionally engaged by the pressure plates 12. The windows are closed by exerting a downward pull on the handles 34, causing the running edges of the windows to slidably move within the vertical guide members between the hood and the body. When the handles are released, the windows are held in closed position, or, alternatively, in the desired partially closed position, by the frictional engagement therewith of the pressure plates in the said vertical guides. To again open the windows to desired position upward lifting pressure is applied to the handles 34.

The central guide member or pillar 6 is so constructed and fitted that it can be swung upwardly into the hood when the windows are not being used. Referring to Figures 7, 8 and 9 of the drawings 35 is a bracket secured to the inner side of the guide member. This bracket slidably and swivelly receives the round lower end portion of an arm 36. The lower end of this arm carries a rod 37, which is slidable in a hole 38 in the bracket 35 and has a stop knob 39. A coiled spring 40 encircles the rod 37 and bears against the end of the arm 36, thus tending to force the guide member or pillar 6 downwardly against the upper edge of the car body. The upper portion of the arm 36 is curved inwardly and is pivoted at 41 to one leaf 42 of a hinge 43. The other leaf 44 of said hinge is secured rigidly to the framework of the hood.

When the windows are to be used, the guide member or pillar 6 is in downwardly extended position as shown in Figure 7, its lower end being held in engagement with the edge of the car body by the action of the coiled spring 40. If desired, a projection or catch 45 may be provided on the upper edge of the car body to engage the lower end of the said guide member or pillar 6 and thus prevent it from being accidentally displaced under car travelling conditions.

When it is desired to swing the guide member or pillar 6 upwardly into the hood, the flexible windows 4 are first slid upwardly to their fullest extent to move them clear of the vertical guides and said pillar 6 is then moved upwardly against the tension of the coiled spring 40. This action releases the lower end of the pillar from the catch 45 allowing it to be then swung outwardly on the hinge 43. When clear of the car body, said pillar 6 is now swivelly reversed on the round lower end portion of the arm 36 to assume the position shown in Figure 9. From this position, the pillar is swung inwardly to the vertical on the hinge 43 and then pivotally swung upwardly into the hood on the pivot 41 so that it fits snugly against the hood framework. A suitable catch may be provided on the hood framework to retain the pillar 6 when thus closed.

To again extend the pillar 6, it is first swung downwardly on the pivot 41 and then moved outwardly on the hinge 43. The pillar is now swivelly reversed on the round lower end portion of the arm 36 and moved inwardly against the car body, where it is held in vertical position by being engaged by the catch 45.

The gripping means within both the curved guide members 8 and the vertical guide members 5, 6, and 7 are deemed to constitute an important feature of the invention as they enable the windows to be held at any desired position without the use of straps, catches, or similar devices. Furthermore, said gripping means effectively prevent rattling of the windows during the motion of the vehicle and they also prevent the ingress of wind or dust between the said guide members and the running edges of the windows.

In lieu of the spring influenced pressure plates, other resilient gripping devices may be employed within the ambit of the invention to frictionally hold the windows in their guides. For example, I may use spring metal strips which are secured to the vertical guide members between the hood and the car body and to the curved guides 8 in the hood or top.

Any suitable locking means can be provided to lock the windows when in closed position to prevent unauthorized access to the interior of the motor-car.

What I do claim is:—

1. In a motor-car or like vehicle having slidable windows of the character described, a vertical pillar supported by an arm, a hinge connecting said arm to the car hood whereby said pillar may be moved outwardly, a pivotal connection between said arm and the hinge whereby said pillar may be swung upwardly into the hood when the windows are not in use, and a swivel connection between said pillar and its supporting arm whereby the pillar may be reversed during its closing action.

2. In a motor-car or like vehicle, the combination claimed in claim 1, and wherein a rod is fitted to the lower end of the pillar supporting arm, and a coiled spring encircles said rod to force the lower end of the pillar against the car body.

3. In a motor car having slidable windows, a vertical pillar adapted to be positioned midway of the car body between the upper edge of said body and hood, an arm having an offset cylindrical portion swively and slidably supporting said pillar, and means supporting said arm whereby the pillar may be swung up beneath the hood.

4. In a motor car having slidable windows, a vertical pillar adapted to be positioned midway of the car body between the upper edge of said body and hood, said pillar including a hinged bracket secured to the hood of the car, a tubular portion extending longitudinally of said pillar and secured thereto, a rod slidably mounted in said tube, one end of said rod being pivoted to the hinged bracket, the other end projecting through the tube and terminating in a ball of greater diameter than said tube, and a coil spring carried in said tube and bearing against said rod to forcibly hold said pillar in position.

In testimony whereof I affix my signature.

LESLIE HARRY TASSELL.